(12) United States Patent
Caplette

(10) Patent No.: US 6,250,028 B1
(45) Date of Patent: Jun. 26, 2001

(54) LIGHT WEIGHT VEHICLE WINDOW CONSTRUCTION

(75) Inventor: Geoffrey K. Caplette, Altadena, CA (US)

(73) Assignee: Transmatic, Inc., Waterford, MI (US)

( * ) Notice: Subject to any disclaimer, the term of this patent is extended or adjusted under 35 U.S.C. 154(b) by 0 days.

(21) Appl. No.: 09/363,541

(22) Filed: Jul. 29, 1999

(51) Int. Cl.$^7$ .............................................. E06B 3/00
(52) U.S. Cl. .................. 52/208; 52/204.597; 52/204.62; 52/204.64; 52/204.69; 52/204.7; 160/371
(58) Field of Search .................................. 52/208, 204.53, 52/204.597, 204.62, 204.64, 204.69, 204.7, 171.2; 160/371

(56) References Cited

U.S. PATENT DOCUMENTS 3,906,669 * 9/1975 Vorguitch .
4,133,367 * 1/1979 Abell .
6,003,277 * 12/1999 Graham et al. ................... 52/204.53

* cited by examiner

Primary Examiner—Blair M. Johnson
(74) Attorney, Agent, or Firm—Christie, Parker & Hale, LLP

(57) ABSTRACT

A lightweight bus window construction has a window frame with a generally U-shaped channel around its lateral edges. A step is provided adjacent the opening of the U-shaped channel along the lower edge with a lip extending above the step along the edge. A thin sheet of plastic glazing material in the frame has its upper and side edges within the U-shaped channel along the upper and side edges, and the lower edge of the sheet rests on the step. The sheet is sufficiently thin that it will flex for fitting the upper and side edges into the channel without disassembling the frame. An elastomeric gasket fills the space between the sheet of glazing material and the face of the U-shaped channel on the opposite of the channel from the lip. The gasket includes a portion along the lower edge extending upwardly above the opening of the U-shaped channel and engaging the face of the sheet of glazing material opposite to the lip. The elastomeric gasket secures the glazing material within the frame.

18 Claims, 2 Drawing Sheets

LIGHT WEIGHT VEHICLE WINDOW CONSTRUCTION

BACKGROUND

This invention concerns a light weight window construction for transportation vehicles such as buses and the like.

An important goal of the manufacturers and users of transportation vehicles such as buses is to reduce the weight of vehicle components since weight reduction significantly reduces operating costs through reduction of fuel consumption. Lighter weight window construction allows lighter weight supporting structures and can reduce vehicle weight beyond the glazing structure itself.

Furthermore, it is desirable that the window glazing be such that it can be rapidly changed in the event of damage. Glazing materials in transportation vehicles may require frequent changes to eliminate the effects of graffiti and scratching. A significant amount of labor is required with current window constructions for removing the glazing and installing new glazing.

The traditional technique employed for bus windows or the like has a U-shaped channel around the frame and a U-shaped gasket that fits around the entire periphery of the window. The U-shaped gasket is placed around the glazing and the entire gasket and glazing unit is then placed in the frame. The U-shaped gasket forms a moisture seal between the frame and the glazing and isolates the glazing from the metal frame. An advantage of this construction is low initial cost. A disadvantage, however, is the labor intensive effort in replacing damaged glazing since the entire frame must be disassembled to replace the transparent glass or plastic.

More recently, some so-called quick change windows have been developed which allow the glazing to be removed and replaced quickly without the necessity of disassembling the entire frame. This may be accomplished, for example, by utilizing two separate seals to secure the glazing and create a moisture barrier. When the glazing is to be replaced, the interior seal can be quickly removed, allowing the glazing to be replaced without disturbing the balance of the frame or seals. This can yield a significant reduction in the time needed to replace the glazing, but such a construction includes a higher initial cost, a decreased security of retaining the glazing in the frame, particularly if the glazing material is retained in the frame primarily by the gaskets, and generally a heavier assembly.

It is therefore desirable to provide a window construction that is both lightweight and susceptible to quick change of the glazing material.

BRIEF SUMMARY OF THE INVENTION

An exemplary lightweight vehicle window construction has a rigid window frame with a generally U-shaped channel around its lateral edges. A step is provided adjacent the opening of the U-shaped channel along the lower edge with a lip extending above the step along the edge. A thin sheet of plastic glazing material in the frame has its upper and side edges within the U-shaped channel along the upper and side edges. The lower edge of the sheet rests on the step. The sheet is sufficiently thin that it will flex for fitting the upper and side edges into the channel without disassembling the frame. An elastomeric gasket fills the space between the sheet of glazing material and the face of the U-shaped channel on the opposite of the channel from the lip. The gasket includes a portion along the lower edge extending upwardly above the opening of the U-shaped channel and engaging the face of the sheet of glazing material opposite to the lip. The elastomeric gasket secures the glazing material within the frame. Preferably a bead extends along an edge of the U-shaped channel on the opposite side from the gasket and engaging the face of the sheet of glazing material. A similar bead extends along the lip for engaging the glazing material.

DRAWINGS

DESCRIPTION

Figure 1:
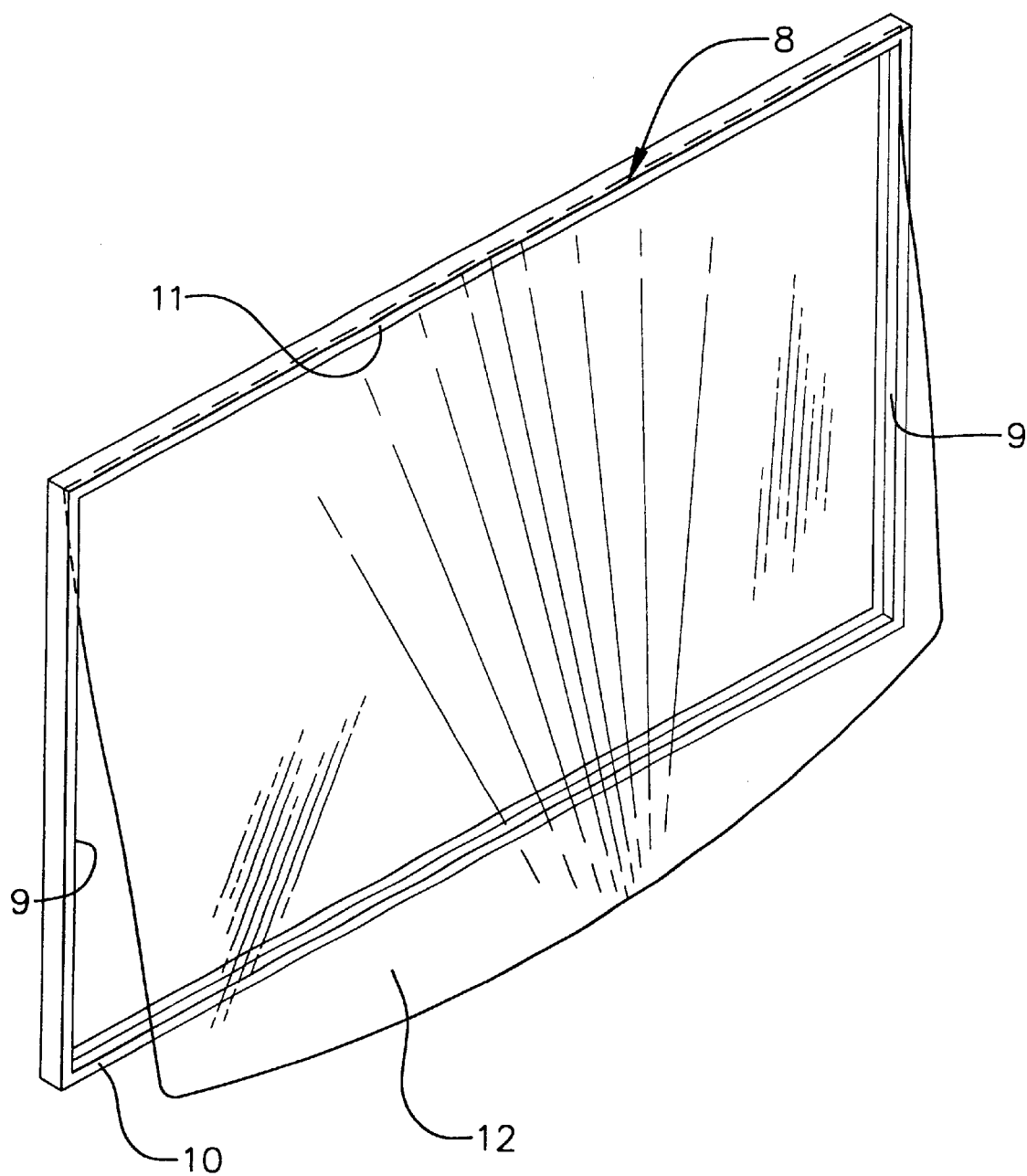
FIG. 1 illustrates a window construction with glazing material flexed for removal or installation.
Figure 2:
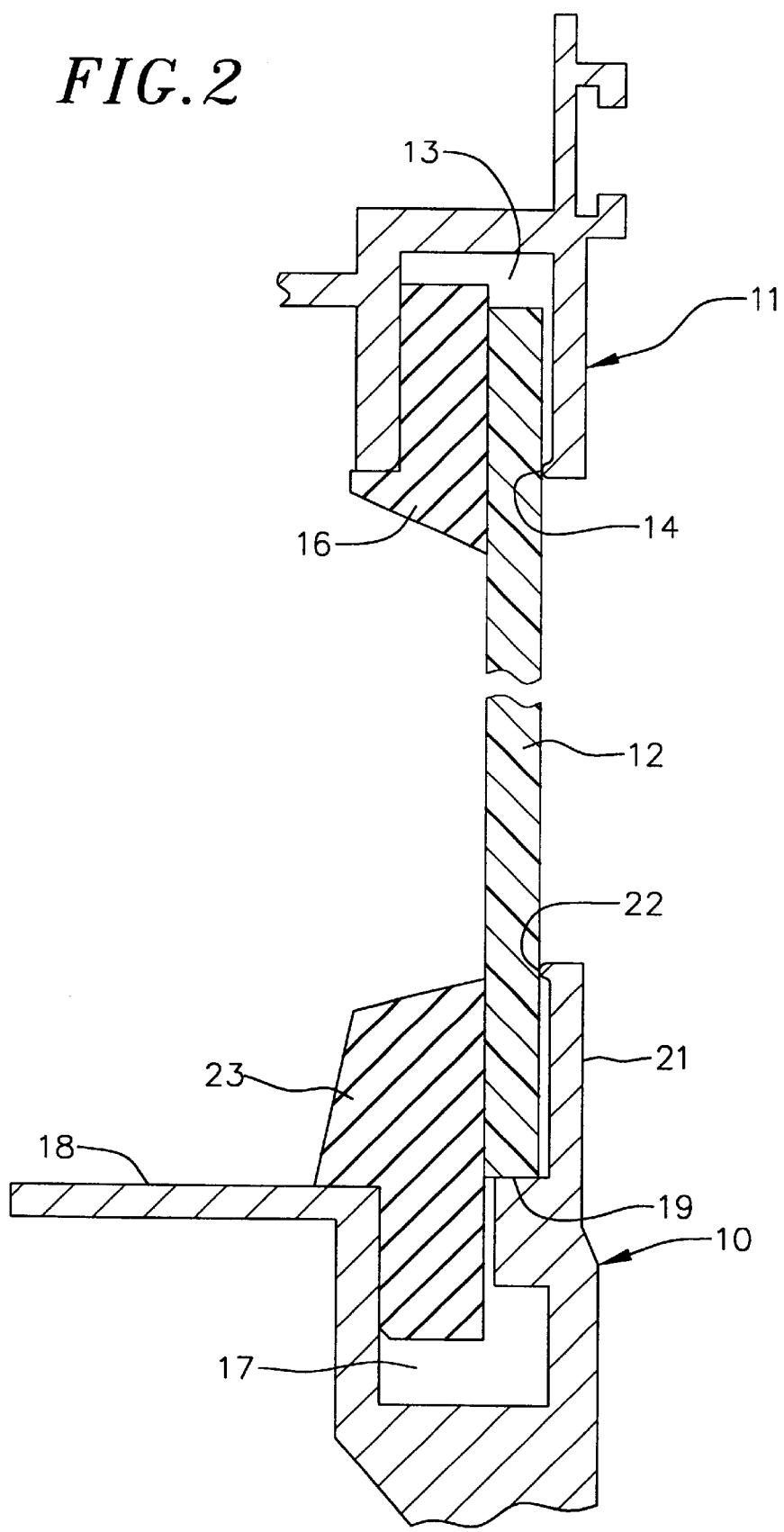
FIG. 2 illustrates in vertical cross-section a thin sheet of glazing material in the upper and lower edges of the frame.

The window construction has a frame 8 comprising a lower frame member 10 and upper frame member 11, each of which is typically an aluminum alloy extrusion. The window frame also includes side frame members 9 which are not illustrated separately in cross-section, since their cross-section resembles the cross-section of the upper frame member. The side frame members are illustrated as integral with the upper frame member, however, it will be understood that these may be separate members meeting at corners of a window. The window, as illustrated is generally rectangular, but parallelogram and other related shapes are also known. The window may be flat or have moderate curvature as is found on some models of buses. The illustrated cross-section of each of the frame members includes miscellaneous steps, bends and fittings which are coincidental with respect to this invention. They are simply exemplary of a window frame for one model of bus. These collateral features may be disregarded for an understanding of this invention.

A sheet of glazing material 12 is fitted in the frame members. The upper frame member includes a U-shaped channel 13 which faces inwardly relative to the frame, i.e., in the "plane" of the window frame. An upper edge of the glazing material fits into the channel. Near the opening of the U-shaped channel on the side nearer the outside of the vehicle there is a small bead 14 which bears against the outside face of the glazing material. An elastomeric gasket 16 is squeezed into the U-shaped channel on the inside of the vehicle and bears against one face of the channel and the opposing, inside face of the glazing material. This gasket provides a moisture seal.

The lower frame member includes a U-shaped channel 17 and has a protruding sill 18 inside the bus. There is a shallow step 19 along the open edge of the U-shaped channel. The upper face of the step 19 is at or above the elevation of the sill. A lip 21 integral with the frame member extends above the step and includes a small bead 22 at its upper edge to bear against the outside face of the glazing material. The lower edge of the glazing material rests on the step 19. The width of the step is no greater than the thickness of the glazing material. This means that the step does not extend beyond the inside face of the glazing material. An elastomeric gasket 23 is squeezed into the U-shaped channel in the lower frame member. The gasket extends above the level of the sill (and hence, above the level of the step) to about the same height as the lip on the opposite face of the glazing material. One face of the lower gasket 23 bears against the inside of the channel and the other face bears against the inside face of the glazing material for securing the glazing material in place and providing a moisture seal.

The glazing material is preferably a sheet of plastic such as polycarbonate or polymethylmethacrylate which is sufficiently thin that it can be flexed so that the upper and side edges can be slipped into (or out of) the upper and side U-shaped channels. In other words, the sheet of glazing material is sufficiently flexible for bending the sheet out of a plane and reducing the distance between the side edges of the sheet to less than the distance between the openings of the side U-shaped channels.

To install a window, the frame is secured in place in the bus in the usual manner. A sheet of glazing material is flexed away from the frame until at least the upper portions of the side edges can be fitted into the U-shaped side channels of the frame. The upper portion of the glazing material is then flattened so that the upper edge can be slipped into the upper U-shaped channel, somewhat as illustrated in FIG. 1. The glazing is shifted upwardly and the lower portion is flattened so that lower portions of the side edges can be slipped into the side channels. As the side edges are fitted into the lower parts of the side frame members, the lower edge is brought against the bead on the lip of the lower frame member. The lower edge is kept far enough up that it does not drop into the U-shaped channel, but instead rests on the step 19.

The elastomeric gaskets are then squeezed into the respective channels. The sequence of installing the gaskets is not known to be significant. The upper and side gaskets may be integral or separate pieces of gasket material.

To remove a sheet of glazing material, the installation sequence is reversed. The elastomeric gaskets are peeled out of the channels. The glazing material can then be pushed from the outside or lifted slightly and pulled from the inside at the bottom center to flex the glazing material and pull it from the channels. Such disassembly and the following assembly of a new sheet of glazing material into the frame are quite rapid and economical.

A sheet of polycarbonate about ⅛ inch thick is appropriate for the size of a typical bus window. Somewhat thicker or stiffer glazing material may be used for larger windows so long as it is sufficiently flexible to permit installation as described. The use of a thin plastic material for glazing has a significant weight reduction as compared with ¼ inch glass or even ¼ inch plastic.

Since the outside face of the glazing material is pressed directly against the frame members by reason of the beads 14 and 22, there can be appreciable load transfer between the glazing material and frame, thereby stiffening the entire assembly and permitting the use of lightweight construction. Since this construction does not include an external elastomeric gasket, bleed holes (not shown) may be drilled through the lower frame member to drain any water that passes between the glazing and frame member.

Although the structure has been described with the gaskets on the inside, it will be apparent that this is largely a matter of convenience in exposition, and at least some convenience for a person wishing to replace a window. If desired, the window parts can effectively be reversed and the window installed from the outside. If desired, a thin gasket may be placed against the outside face of the glazing material.

In another embodiment, a similar frame construction may be used with a sheet of more-or-less rigid glazing material effectively permanently mounted in the frame. A flexible sheet of plastic glazing material may be installed and removed as described, as a sacrificial layer to be replaced when scarred by graffiti or the like.

Although the frame members are illustrated as integral extrusions forming U-shaped channels for the glazing material and gaskets, it will be apparent that the frame members may be assembled from separate extrusions or roll formed members.

Other modifications and variations will be apparent to those skilled in the art, and it is therefore to be understood that within the scope of the present invention this invention may be practiced otherwise than as specifically described.

What is claimed is:

1. A lightweight vehicle window construction comprising:
    a generally rectangular frame having upper, lower and side frame members, each of the frame members including a generally U-shaped channel facing inwardly relative to the frame members;
    a sheet of glazing material mounted in the frame, the upper and side edges of the glazing material being in the upper and side channels, wherein the upper and side channels each have two outer members extending inwardly beyond the upper and side edges, respectively of the glazing material;
    a step on the lower frame member at the opening of the lower U-shaped channel, the lower edge of the glazing material resting on the step;
    a lip adjacent the opening of the lower U-shaped channel and extending above the step, a portion of the lip engaging a first face of the glazing material; and
    an elastomeric gasket in each U-shaped channel having a face engaging a second face of the glazing material.

2. A lightweight vehicle window construction according to claim 1 wherein the sheet of glazing material comprises a plastic material sufficiently flexible for bending the sheet out of a plane and reducing the distance between the side edges of the sheet to less than the distance between the openings of the side U-shaped channels.

3. A lightweight vehicle window construction according to claim 1 wherein the sheet of glazing material is a plastic material that is sufficiently thin to flex for fitting the upper and side edges into the respective channels without disassembling the frame.

4. A lightweight vehicle window construction according to claim 1 further comprising a bead along an edge of the upper and side U-shaped channels engaging the face of the sheet of glazing material opposite to the gasket.

5. A lightweight vehicle window construction according to claim 4 further comprising a bead along the lip engaging the face of the sheet of glazing material opposite to the gasket.

6. A lightweight vehicle window construction according to claim 1 wherein the gasket along the lower edge engages a face of the sheet of glazing material at about the same height as the lip above the step.

7. A lightweight vehicle window construction comprising:
    a rigid window frame having a generally U-shaped channel within upper, lower and side frame members, a step adjacent the U-shaped channel along the lower frame member, and a lip extending above the step along the lower frame member;
    a sheet of plastic glazing material in the frame, the upper and side edges of the sheet being within the U-shaped channel along the upper and side frame member, wherein the U-shaped channel along the upper and side frame member has two outer members extending inwardly of the frame beyond the upper and side edges of the sheet, the lower edge of the sheet resting on the step, and the sheet being sufficiently thin to flex for fitting the upper and side edges into the channel without disassembling the frame; and
    an elastomeric gasket filling space between the sheet of glazing material and a face of the lower U-shaped channel on the opposite side of the lower U-shaped channel from the lip, the gasket including a portion along the lower edge extending upwardly above the opening of the lower U-shaped channel and engaging a face of the sheet of glazing material opposite to the lip.

8. A lightweight vehicle window construction according to claim 7 wherein the height of the extending portion of the gasket is approximately the same as the height of the lip.

9. A lightweight vehicle window construction according to claim 7 further comprising a bead along an edge of the U-shaped channel engaging the face of the sheet of glazing material opposite to the gasket.

10. A lightweight vehicle window construction according to claim 8 further comprising a bead along the lip engaging the face of the sheet of glazing material opposite to the gasket.

11. A lightweight vehicle window construction according to claim 7 wherein the width of the step is no greater than the thickness of the sheet of glazing material.

12. A lightweight vehicle window construction according to claim 7 further comprising a bead along the lip engaging the face of the sheet of glazing material opposite to the gasket.

13. A lightweight vehicle window construction comprising:

a frame having upper, lower and side frame members;

a sheet of glazing material mounted in the frame, first and second faces of the glazing material adjacent the upper and side edges of the glazing material being located between portions of the upper and side frame members, respectively, and the lower edge of the glazing material being no lower than one portion of the lower frame member so that the lower edge of the glazing material can be removed from said lower frame member;

an elastomeric gasket in each frame member having a face engaging the first face of the glazing material; and a lip on the lower frame member above the elevation of the lower edge of the glazing material on the second face of the glazing material opposite from the elastomeric gasket.

14. A lightweight vehicle window construction according to claim 13 further comprising a bead along an edge of each frame member engaging the face of the sheet of glazing material opposite to the gasket.

15. A lightweight vehicle window construction according to claim 13 comprising a bead along the lip engaging the face of the sheet of glazing material opposite to the gasket.

16. A lightweight vehicle window construction according to claim 13 wherein each frame member comprises a generally U-shaped extrusion and the gasket material is in a U-shaped channel in the extrusion.

17. A lightweight vehicle window construction according to claim 13 wherein the sheet of glazing material comprises a plastic material sufficiently flexible for bending the sheet out of a plane and reducing the distance between the side edges of the sheet to less than the distance between the side frame members.

18. A lightweight vehicle window construction according to claim 13 wherein the sheet of glazing material is a plastic material that is sufficiently thin to flex for fitting the upper and side edges into the respective frame members without disassembling the frame.

* * * * *